Jan. 19, 1965 L. H. GRAHAM 3,166,712

BALANCED OUTPUT DEMODULATOR FOR PULSE POSITION MODULATION

Filed Nov. 5, 1962 4 Sheets-Sheet 1

INVENTOR.
LAWRENCE H. GRAHAM

BY Julian C. Renfro

ATTORNEY

INVENTOR.
LAWRENCE H. GRAHAM
BY Julian C. Renfro
ATTORNEY

INVENTOR.
LAWRENCE H. GRAHAM
BY Julian C. Renfro
ATTORNEY

INVENTOR.
LAWRENCE H. GRAHAM
BY Julian C. Renfro
ATTORNEY

United States Patent Office 3,166,712
Patented Jan. 19, 1965

3,166,712
BALANCED OUTPUT DEMODULATOR FOR PULSE POSITION MODULATION

Lawrence H. Graham, Orlando, Fla., assignor to Martin-Marietta Corporation, Middle River, Md., a corporation of Maryland Filed Nov. 5, 1962, Ser. No. 235,315
9 Claims. (Cl. 325—321)

My invention relates to a pulse position demodulator and more particularly to a self-synchronous pulse position demodulator having the capability of providing a balanced output, which overcomes certain disadvantages inherent in prior art techniques.

In the past, many demodulators have derived a control voltage which is used to synchronize the demodulating sawtooth from the incoming pulse position demodulated signal by means of an unbalanced circuit wherein the local timing circuit or clock is required to run at a frequency either greater than or less than the nominal operating frequency. This is so since the control voltage will be of one polarity, consequently in the absence of incoming pulse trains, the clock frequency will change and return to its normal uncontrolled frequency. When the pulse train resumes the clock must then be readjusted to its correct operating frequency. This technique unavoidably causes transients to occur as the clock is pulled into correct synchronization, producing undesirable noise in the output signal.

It is therefore an object of my invention to provide a pulse position demodulator which operates in a self-synchronous mode, that is, that the control voltage to synchronize the local timing clock is derived from the information-bearing pulses themselves, such that the natural frequency of the clock is essentially the normal operating frequency and may differ slightly in either a fast or slow condition from such normal operating frequency due to natural instabilities, and to provide a correcting voltage of either polarity as necessary to increase or decrease the clock rate. It is a further object of my invention to eliminate undesirable noise-producing transients resulting from the above mentioned prior art techniques which have large initial synchronization error.

Advantageously, this invention accomplishes these desirable characteristics by providing a balanced or push-pull type circuitry eliminating any average D.C. level from the audio output and from the control voltage output and thus providing a control voltage output when the clock is either slow or fast, which will be of either positive or negative polarity.

This invention is particularly applicable to pulse position demodulation systems which attempt to provide a low density of pulses thereby achieving maximum usefulness of the communication channel, such communication channel being conventional wire communications or radio frequency transmissions systems, such low pulse density systems normally utilize voice or other signal operated relays such that their outputs are in the form of bursts of signal pulses and substantial pauses wherein no pulses are transmitted. My invention also is advantageous in such systems where some pulses may be missed due to transmission anomalies or other unavoidable interruptions.

The aims of this invention are met by the utilization of a clock oscillator which is very quickly responsive to any applied control voltage, but having storage means or memory for the generated control voltage, which memory is long compared to a normal signal sample period. Thus, for either missing pulses for several signal sample periods or for normal signal pauses, the clock will continue to operate in response to the last received control voltage.

As this voltage decays and finally disappears due to the complete absence of incoming pulses, the clock will then operate at or very near to the nominal clock frequency. Consequently, the difference between the clock frequency at the time that a new pulse train appears and the correct frequency required for demodulation of the pulse train will be quite small and will very quickly be corrected by the resulting control voltage and very little noise or distortion will thus be introduced into the demodulated signal output.

My balanced output detector therefore may comprise input means for receiving a train of incoming pulse position modulated pulses, and controllable frequency waveform generator means for generating at the output thereof at least one recurrent voltage waveform having an amplitude at any instant which is a linear function of time and having an average frequency approximately that of the source of said incoming pulses. Means are also provided for combining the pulse train and the output from said waveform generator means for developing first and second trains of resultant positive and negative pulse pairs containing amplitude information, and means for adding the pairs of opposite polarity resultant pulses to produce a pulse train of difference amplitude pulses whose envelope represents the modulated information from the source of incoming pulses. Additionally, means are provided for sensing any non-symmetry of the envelope with respect to a reference voltage level to generate a signal for correcting the phase and frequency of said waveform generator means, to restore the envelope of said difference pulses to the symmetry condition.

Alternative means are provided herein for providing these first and second trains of resultant positive and negative pulse pairs as a result of the combination of the incoming pulse train and the output from said waveform generator means, and one of these techniques may involve the use of pulse inverter means employed to provide a train of pulses that are of opposite polarity with respect to the train of incoming pulses, with both of these trains being respectively combined with the output of said waveform generator means in order to provide the pulse train of difference amplitude pulses, the envelope of which represents the output modulation information from the source of incoming pulses. Alternatively however I may provide oppositely going output waveforms from the waveform generator means, which are combined with the train of incoming pulses to provide the pulse train of difference amplitude pulses. In either embodiment, means are advantageously provided for sensing the symmetry of the output waveform with respect to a referenced voltage level and for generating a D.C. potential which reflects the extent and direction of any non-symmetry of the envelope to bring about control of the waveform generator for restoration of the envelope of the difference amplitude pulses back to the symmetry condition.

The means for adding the output of the waveform generator means with the train of pulses containing pulse position modulation information may include the use of conventional computer type AND and OR gates employed to retrieve amplitude information when comparing pulse information to a ramp waveform. In computer applications, these gates have been used primarily to sense a "0" or "1" state, but in this instance one of their inherent features is employed to replace fairly expensive bridge gating techniques usually employed in modulators of this type. Whereas the usual technique has involved the fact that when a conventional two input diode AND gate is supplied with input signals, the output signal will be determined by that signal having the lowest amplitude, in the present instance, by contrast, one input to such a gate may have a zero potential and the other input may receive a recurring ramp signal. Consider now the application of a pulse signal to the input normally held to zero. If the amplitude of this pulse exceeds the maximum amplitude of the ramp signal, the ramp signal will at all times be the controlling factor in determining the output pulse amplitude of the gate at the time of occurrence of such a pulse. Therefore, in the present instance, the amplitude of the output signal of the AND or adder gates employed will be a function of the amplitude of the ramp generator at the time of its coincidence with the received pulse information. A two input gate of the type employed consists solely of two diodes and one resistor, thus complying with simplicity requirements.

My invention is particularly adapted for, but of course not limited to, use in conjunction with the invention of McKay Goode entitled "Discrete Address Communication System With Random Address Capabilities," Serial No. 107,194, filed May 2, 1961, and assigned to the assignee of the present invention. In the receiver portion of such a device, radio frequency information is received which occurs for short duration and has a frequency-time relationship between the pulses that identifies a particular code or address. This information is detected and converted into pulse information occurring on three related frequencies, $f_1$, $f_2$, and $f_3$.

To retrieve information it is necessary to pass pulses corresponding to frequencies $f_1$, $f_2$, and $f_3$ through associated delay lines which serve to delay these pulses by time increments corresponding to the address code. These pulses are then fed into a three input AND gate to establish coincidence, and only those pulses having the correct time-frequency relationship will pass through the gate. The coincidence pulse contains modulation intelligence and is the input signal to the pulse position decoder.

These and other objects, features and advantages may be better understood from a study of the enclosed drawings in which.

Figure 1:
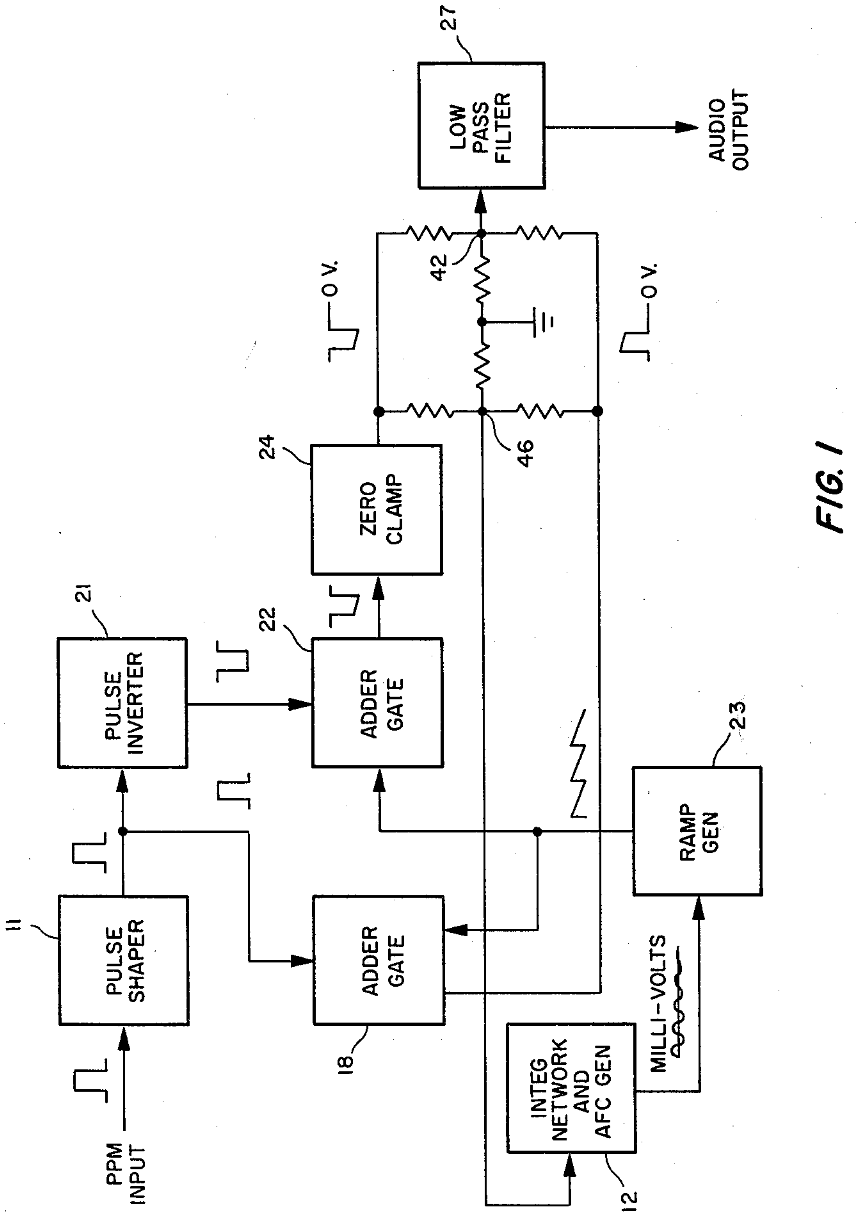
FIGURE 1 is a block diagram of the preferred embodiment of my balanced output demodulator.

Referring to the preferred embodiment shown in FIGURE 1, the pulses entering the demodulator at PPM Input are shaped in pulse shaper 11 by first amplifying, and then differentiating, with the differentiated signal firing a one-shot multivibrator also located in device 11. The shaped pulse output of device 11 is then used as input signals to adder gate 18, and via pulse inverter 21 to adder gate 22. The output of the inverter 21 is the original shaped pulse that has been inverted by known techniques. The pulse has the same width as the original shaped pulse, and as a result of the unity gain of the inverter, its amplitude is the complement of the original.

In accordance with this invention I employ a recurring waveform such as a ramp signal whose repetition rate is a linear function of time and whose average frequency is approximately that of the source of incoming pulses. The transmitter sampling rate may be 8 kc., and the output waveform from the ramp generator 23 may therefore be a nominal 8 kc. The ramp generator contains a clock, differentiator, amplifier and sawtooth generator, the output of which is directly connected to adder gates 18 and 22.

Adder gates 18 and 22 therefore receive as inputs the output of shaper 11 and the ramp generator 23. These gates are diode AND gates which have zero output until the ramp from ramp generator 23 is in time coincidence with the incoming pulse, at which time each gate has an output proportional to the sum of the ramp voltage and the incoming pulse voltage at the time of coincidence. In other words, the incoming pulse gates the ramp voltage during its time of occurrence, producing an output pulse whose amplitude is dependent on the instantaneous ramp voltage at time of gating.

The output from gate 18 is a series of positive pulses whose amplitudes therefore are determined by coincidence between the incoming PPM type pulses and the ramp waveform, with the output pulses necessarily being of varying amplitudes. Thus, the ramp and gate 18 have performed the operation of conversion from pulse position modulation to pulse amplitude modulation where all pulses are positive going.

In accordance with this embodiment of the present invention, the gate 22 furnishes negative going pulses for balanced operation, being a diode AND gate designed to accept the negative pulses from pulse inverter 21 and the ramp waveform from generator 23, and to put out a series of negative going pulses of varying amplitudes that are in coincidence with the output pulses of gate 18. These negative pulses are clamped to zero by passing them through a zero clamp 24, which may be in the nature of an emitter follower, and which operates between zero and a minus supply, thus assuring that the base line of the negative going pulses is at zero reference. Thus, the ramp and gate 22 have performed the complementary operation of the ramp and gate 18. In the foregoing manner, therefore, first and second trains of resultant positive going and negative going pulses containing amplitude information are created, in which the amplitudes of the pulses of each pair of pulses are thus proportional and inversely proportional, respectively, to the time of arrival of the pulse pairs with respect to the recurrent waveform. These pairs of opposite polarity resultant pulses are then added together, as hereinafter described, to produce a pulse train of difference amplitude pulses, with the envelope of the difference amplitude pulses thus representing the modulation information.

Figure 2:
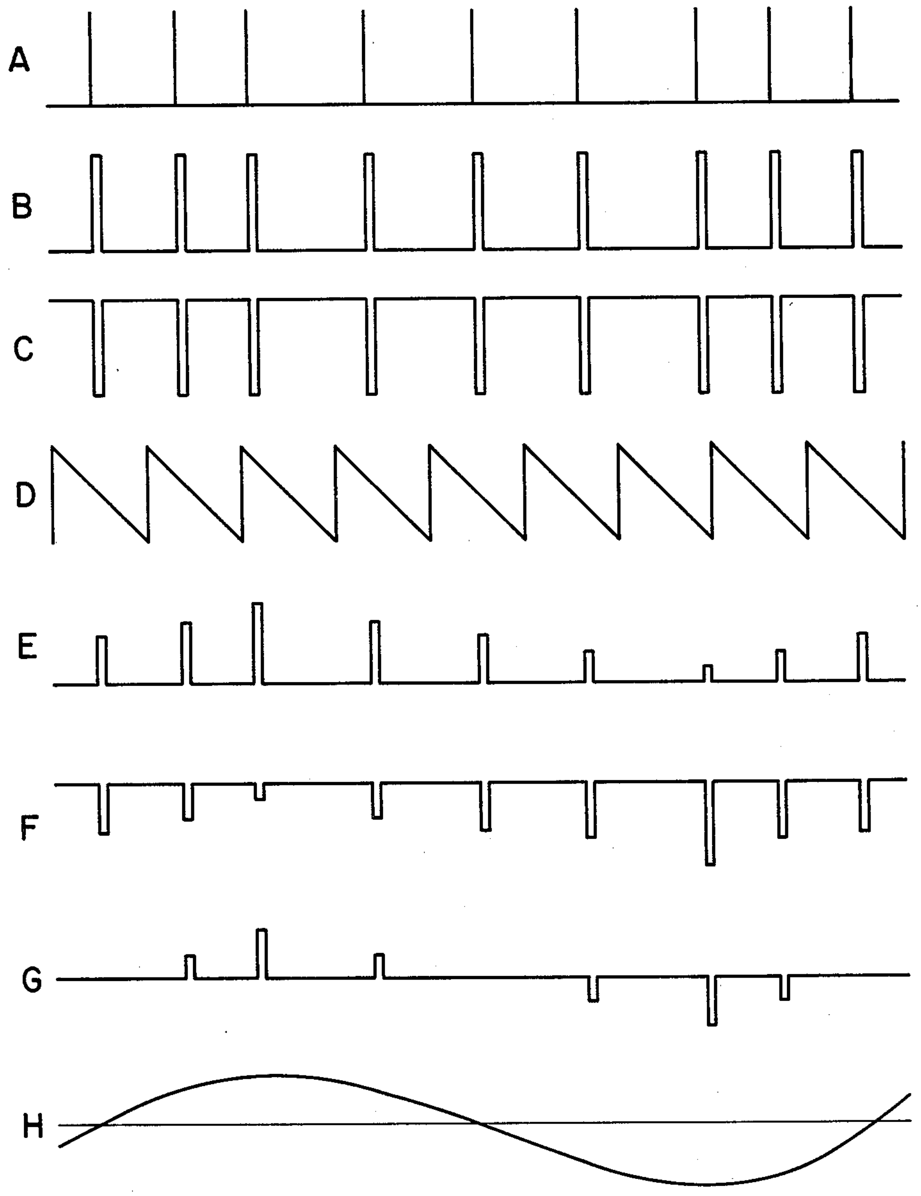
FIGURE 2 is a waveform diagram.

Referring to FIGURE 2, the series of pulses appearing in Line A represent information bearing pulses such as may be emanating for example, from a coincidence AND gate of an address decoder, or any system emanating pulse position modulated information, and are therefore the input pulses to shaper 11. Such pulses typically are not uniformly spaced, and may vary in width and amplitude, with the lack of uniformity of spacing being due to the modulation technique employed, such as pulse position modulation, while the width and amplitude of each pulse is determined by signal transmission characteristics.

Line B represents these pulses after passing through shaper 11, it being noted that these new pulses are of a fixed width and amplitude because of the shaper action.

Line C represents the output of inverter 21, it being noted that these pulses are of the same amplitude as those of Line B, but of the opposite polarity.

Line D represents the sawtooth waveform as generated by ramp generator 23, the repetition rate being set to correspond with the sampling rate of the transmitter.

Line E is the output train of gate 18, and is derived by the comparison of Line B with Line D through adder gate operation. Amplitude information is determined by the coincidence of the two input signals, with the amplitude of the resultant pulses varying in accordance with the location on the sawtooth of the intercept points of the pulses.

Line F represents the pulses derived by operation of adder gate 22. This train of pulses are the resultant amplitude information obtained when waveforms denoted by Lines C and D are compared in accordance with the normal gating operation of gate 22. As should now be apparent, the pulse information gates through the ramp amplitude at time of coincidence, and the relative position of pulses appearing on Line C to waveform of Line D is, of course, a function of the modulating signal.

Lines E and F therefore may be seen to depict the pulses that enable the reconstruction of a balanced output from my demodulator. To this end a summing network is provided, which utilizes a conventional resistive adding technique that in effect obtains the resultant amplitude of Lines E and F.

Line G is the summed output as obtained by the summing network, and as will be noted, positive pulses are derived when the positive pulse amplitudes of Line E are greater than corresponding negative pulses of Line F, and conversely, the negative pulses of Line G are derived when the amplitudes of the negative pulses of Line F are greater than that of corresponding positive pulses of Line E. It should be noted with respect to Line G that in accordance with this invention, its base line is in effect a reference voltage level of zero potential, which is significant in the event pulses are missed.

Line H represents the A.C. component of the reconstructed speech, derived from filtering the pulse information as contained in Line G, which for the purpose of illustration is shown as a sinusoidal wave. It should be noted that in accordance with this invention, the A.C. component is normally symmetrical about the zero potential reference point.

This balanced demodulator output in accordance with this invention is advantageous in that for the case of missing pulse information, no transients or D.C. shifts are permitted to occur in the output because of loss of clock synchronization due to their absence. Such an undesired result was however possible in prior art techniques because the received information, when used for synchronization of the local clock, was either a positive or a negative control signal, thereby permitting control or clock pull-in from one direction only, and when pulse information was missing, the demodulator clock would drop out of synchronization and cause large transients to occur in the audio output, emitting audible popping.

In this invention, this condition is eliminated because of its highly advantageous balanced demodulation technique, whereby in the absence of pulse information, its output goes to zero. At zero or no pulse condition, the clock control voltage also goes to zero permitting the clock to return to its natural frequency. This frequency change is small because of the fact that the clock control is bilateral in nature, and permits operation about the natural frequency of the clock.

It is desirable to provide automatic frequency control to establish a local reference for synchronization of the repetition rate of the Ramp Generator 23 with the sampling rate employed at the transmitter. To that end I provide an automatic frequency control loop for the establishment of a local reference, which involves the use of a summing network 46, and an Integrating Network and AFC Generator 12. Summing network 46 is a conventional analog summing network employed to algebraically sum the outputs of gates 18 and 22, and the output or error signal from this network is time averaged by the integrator. The error signal is either positive or negative, dependent upon the frequency of the clock in the Ramp Generator 23. The amplified error signal will cause the frequency of this clock to increase if negative, or decrease if positive, in a self correcting manner to be described in greater detail hereinafter.

Network 42, which is of lower impedance than network 46 is employed to perform a similar summing operation, so that the same type of information as supplied to the Integrating Network can be supplied to Low Pass Filter 27, wherein the Audio Output is derived by filter action.

Figure 3:
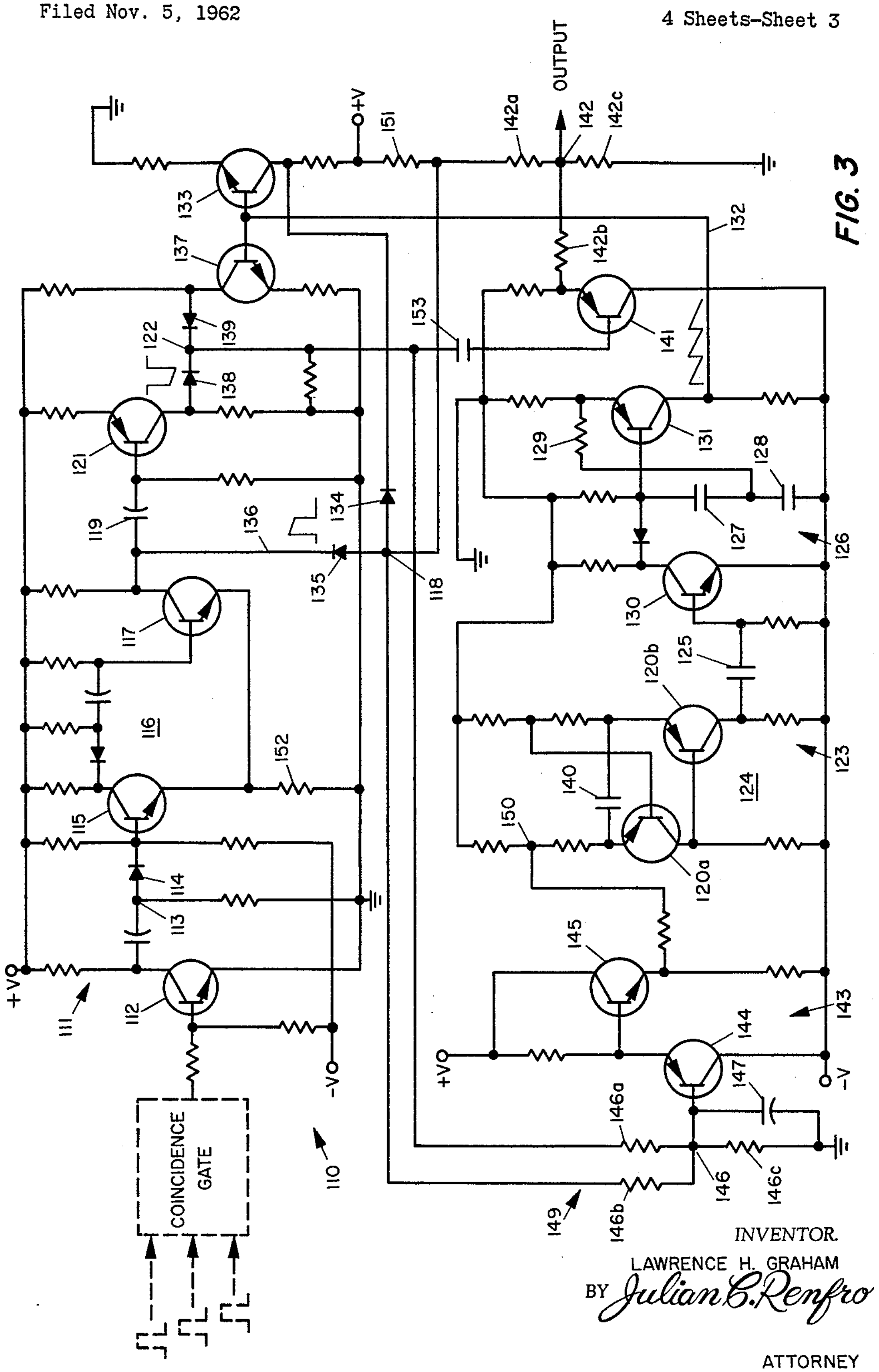
FIGURE 3 is a schematic diagram showing the specific components used in the demodulator according to FIGURE 1.

Referring to the circuit diagram set forth in FIGURE 3, the decoder 110 principally comprises shaper 111, which for example as previously stated may receive pulses from the address coincidence AND gate representing the coincidence of three input pulses to the gate. However, the decoder manifestly could receive its inputs from an entirely different type of PPM source.

The power source for the demodulator may be taken from a +12 volt and −12 volt supply, connected respectively to the +V and −V terminals. The input pulses are received at the base of transistor 112 of the shaper, and this transistor serves to amplify the signal to a usable level. Its output is then differentiated by a differentiating network 113, involving a conventional R–C device. This differentiation operation produces a positive going spike at the leading edge of the shaped pulse, and negative going spike at the trailing edge. This signal is passed through diode 114 which serves to remove the negative going spike and to drive the base of transistor 115 that serves as the input transistor of a one shot multivibrator 116 that includes transistor 117. This bistable device functions in an expected manner to convert the positive portion of the differentiated amplified input pulse into a pulse having a fixed width and amplitude, such as a pulse of 10 microseconds width and 10 volts amplitude.

The output of the one shot multivibrator is directly coupled to diode 135 of gate 118, which gate consists essentially of diodes 134 and 135, and corresponds to gate 18 of FIGURE 1. This output is also coupled through capacitor 119 to the base of the inverting amplifier 121, which is a transistorized amplifier having unity gain that serves merely to furnish the complement of the shaped pulse. The output of the inverter 121 goes to gate 122, which consists principally of diodes 138 and 139, and corresponds to gate 22 previously discussed.

As mentioned in conjunction with FIG. 1, waveform generator means in the form of a ramp generator is employed for retrieving amplitude information from position modulated pulses, which device appears in FIGURE 3 at 123. The ramp generator includes a transistorized clock or square wave generator 124, an R–C differentiator 125, reset driver 130, and a sawtooth generator 126. Clock 124 is a free running bistable device which includes transistors 120*a* and 120*b* and their associated resistive and capacitive clock frequency setting components, latter including transistors 144 and 145. These components determine the natural operating period of this device, and more particularly, commutating capacitor 140 is initially charged when the supply voltage is applied to the unit, which may be +12 volts. In coincidence with the charging of this capacitor, transistor 120*b* is in the conduction state, thereby causing capacitor 140 to be discharged. When the remaining potential on the capacitor reaches a present level it will cause transistor 120*a* to conduct, thereby discharging capacitor 140 completely and causing transistor 120*b* to be cut off. During the remaining natural period of oscillation of the clock, the capacitor 140 is recharged thereby changing the bias on transistor 120*b* and causing it to conduct, and causing transistor 120*a* to be cut off.

This cycle of the clock function is 125 microseconds, or in other words operates to put out an 8 kc. square wave to differentiator 125. The output of the clock is thus differentiated to obtain a positive pulse or spike of short duration, and serves as the input signal to reset driver 130 to cause it to conduct during the period of the pulse duration. During the conduction period of the reset generator, there exists a low impedance to ground, which thereby permits the discharging of integrating capacitors 127 and 128 of the sawtooth generator 126 through the diode 154 of the reset driver 130. Diode 154 is used to block the D.C. current flow that would otherwise charge these capacitors. Upon being reset, the sawtooth generator will be in such a state as to cause charging of capacitors 127 and 128 to the level of the supply voltage. The R–C charging time constants, resistor 148, and capacitors 127 and 128, are selected to assure operation of the generator over a linear portion of the charging curve at the selected generator repetition rate. To increase the linearity of the sawtooth generator, feedback is employed, which is obtained by coupling the junction of capacitors 127 and 128 through resistor 129 to the emitter of a PNP amplifier transistor 131. Appearing at the collector of transistor 131 is a sawtooth waveform whose amplitude varies negatively from a positive level, in a regularly recurring manner, as shown in Line D of FIGURE 2.

The foregoing waveform is delivered to adder gate 118 by means including a lead 132 that is connected to the bases of transistors 133 and 137, which serve to amplify the sawtooth waveform. The output of transistor amplifier 133 is coupled to diode 134 of gate 118. The other input to this gate, diode 135, receives the output pulse of the shaper 111, by means of lead 136.

Gating action of gate 118 is of course performed by the action of diodes 134 and 135, where the normal action of this gate is such that the current flow through load resistor 151 is a function of the back biasing of signals appearing at the inputs of diodes 134 and 135. When no signal pulse is present at the input of diode 135, diode 135 is in a forward biased, or in a conducting condition, and diode 134 is in a back biased or non-conducting condition, thus presenting a low impedance path from gate 118 output through said diodes, transistor 117 which is saturated, and resistor 152 to ground thereby clamping the gate output at essentially zero potential, and thus causing the sawtooth voltage present at the input of diode 134 to be effectively blocked. Diode 135 is thus the controlling diode in that it is normally forward biased by the output of shaper 111 and only becomes back biased when a pulse is received from the shaper, whose amplitude is nearly equal to the supply voltage.

During the period of time that diode 135 is back biased in response to a received pulse from shaper 111, the amplitude out of adder gate 118 across load resistor 151 will be determined by the potential of the ramp waveform appearing at the input of diode 134 at the instant of the arrival of the pulse from the shaper, thereby typically giving a series of pulses whose amplitudes are determined by their coincidence with the applied sawtooth waveform, as depicted in Line E of FIGURE 2. These pulses appear at input resistor 146*b* connected to the base of transistor 144 of the clock frequency setting components.

Gate 122 operates in a similar fashion to gate 118 and receives its input signals from the inverter 121, and from the sawtooth generator. The collector of inverter 121 is connected to gate diode 138, and the collector of transistor 137 is connected to gate diode 139. The base of transistor 137 receives by lead 132 the output from the sawtooth generator, as previously mentioned, which transistor serves to amplify the sawtooth waveform that is directly coupled to diode 139 of adder gate 122.

When no signal pulse is present at the input of inverter 121, this transistor is in the saturated condition and the diode 138 is in the forward biased condition, thereby holding gate 122 at or near the positive supply voltage. Diode 139 is back biased, thereby blocking the sawtooth voltage from appearing at the output of gate 122.

At the same time a pulse from shaper 111 is received at the input of transistor 117 to gate through the sawtooth to gate 118 as previously described, this pulse simultaneously appears at the input of transistor 121, driving transistor 121 to the cut-off condition thereby back biasing diode 138 of gate 122 and causing diode 139 to become forward biased. Due to the forward biasing of diode 139, the sawtooth voltage at the collector of transistor 137 appears at the output of gate 122. This output is thus a pulse whose amplitude is proportional to the difference between the instantaneous sawtooth voltage and the positive reference voltage associated with gate 122. It should be noted that this amplitude is negative going and the complement of the positive going pulse which simultaneously appears at gate 118.

Returning to FIGURE 2, Line E represents the train of positive going pulses appearing at gate 118 in response to a series of pulse position modulated pulses from the shaper to transistor 117, and Line F represents the complementary train of pulses appearing at gate 122 from the same sequence of input pulses simultaneously present at transistor 121. The train of pulses shown on Line F appearing at the output of gate 122 is A.C. coupled through capacitor 153 to the input of emitter follower transistor 141. This train of A.C. coupled pulses is thus clamped to ground or zero potential by means of the emitter follower, thereby assuring that the base line associated with the pulses on Line F is clamped to ground in the same manner that the output of gate 118 shown in Line E is clamped to ground.

A summing network 142 is provided for the algebraic addition of output pulses of adder gates 118 and 122 and consists of resistors 142*a*, 142*b* and 142*c*. The summing network employed is a simple resistive network, whose output is a series of positive and negative pulses whose amplitudes are a fair approximation of the amplitudes of the modulating signal at the time of sampling at the transmitter. Resistor 142*a* is connected to receive the output of gate 118, whereas resistor 142*b* is connected to receive the output of zero clamp 141, which is the output of gate 122 as clamped to zero reference. Resistors 142*a*, 142*b*, and 142*c* are connected together to form the output point for the summation network, with 142*c* being connected from this junction point to ground to provide a current path to ground. The summer output appears in Line G, of FIGURE 2, as was mentioned in conjunction with the description of summer 42 in FIGURE 1. The output from the summer 142 is fed into a filter for smoothing and reconstruction of audio information, and as illustrated by Line H of FIGURE 3, this output varies at an audio rate. This reconstructed signal is amplified and then fed to an appropriate sound transducer for audio presentation.

Automatic frequency control (AFC) is utilized in this invention for the purpose of establishing a local reference at the receiver and is accomplished without the benefit of synchronization information as such being received from the transmitter. AFC error signals are derived by the integration or time averaging of demodulated pulse position modulation information, whereby this error signal so derived will control the clock frequency at the receiver, plus phase locking of the clock with incoming pulse information. The demodulated pulse position information contains amplitude information, and results in a train of pulses varying in amplitude and alternately going positive and negative. When this pattern is viewed as a function of time, the amplitudes so defined will outline a symmetrical waveform as denoted by line G of FIGURE 2.

Automatic frequency control of the clock 124, which determines the repetition rate of the ramp generator, is derived by a resistive summing network 146, integrating capacitor 147, and clock driver 143. The network 146 includes a resistor 146*a* connected to receive the output from gate 122 and resistor 146*b* connected to receive the output from gate 118, each of which is connected to resistor 146, the other end of which is grounded to provide a current path. The transistors 144 and 145 form the clock driver 143, which serves as the AFC amplifier, and the output of which is the error signal which is coupled directly to the clock control point 150 of clock 124 for frequency control and phase locking.

Input signals to the summing network 146 are of course the coincident output pulses of adder gates 118 and 122, and the signals appearing at the junction of the summer resistors will be pulses whose amplitudes are a function of the amplitude difference between the input signals as received from these two gates. Therefore, the output of the summing network resembles the train of pulses denoted in Line G of FIGURE 2. Resultant amplitude differences between the two summing network input pulses is integrated and stored by integrating capacitor 147, which represents AFC information that determines the time averaged D.C. level. The output of integrator 147 is directly coupled to the clock driver or AFC amplifier 143, the transistors 144 and 145 of which are connected in a common emitter configuration. The input signal more particularly is delivered to the base of transistor 144 which, in the absence of pulses, is essentially biased at ground potential by resistor 146 and capacitor 147, thus establishing a quiescent operating point for the clock, which is essentially represented by the clock operating at its natural frequency in accordance with its initial frequency setting.

In the presence of pulses, a potential will be noted at the base of transistor 144 due to the charge on capacitor 147, the magnitude of which is dependent upon the difference of pulse amplitude out of the summing network 146. The two stage AFC amplifier offers a high impedance load to integrator 147 and advantageously permits a short time constant for AFC control and a long time constant for the discharge of the integrating network 147. Accordingly, as a result of this configuration, the clock will have a fast pull-in time for frequency control and phase locking, plus a long drop-out time, thereby permitting a hold condition for clock control in the event of missing pulse information.

More particularly, since transistor 144 operates between a positive and negative supply potential, with zero potential applied to its base, base current will flow, and cause sufficient collector current to flow causing the emitter of this stage, except for the emitter to base drop, to be disposed at the base potential. At the same time, the emitter potential appearing at the emitter of transistor 144, is also the input signal to the base of transistor 145, thereby causing sufficient base current flow in transistor 145, to effectively control its collector current flow such that its emitter potential will be equal to the base potential minus the potential drop from its base to emitter. The potential appearing at the emitter of 145 is connected to clock control point 150 and this potential is the AFC error signal for clock frequency control. When the receiver clock is higher in frequency, the error signal of point 150 is more positive than a quiescent operating point of say 0.7 v. positive, and will have a magnitude of millivolts, whereas if the clock frequency is low, the error signal will become more negative than the normal quiescent potential.

More particularly, in the quiescent stage, the control voltage appearing at the clock control point 150 may, as mentioned above, be +0.7 volts D.C. and will permit the clock to operate at its natural frequency as determined by frequency adjustment setting. In the presence of pulse information, and in an unsynchronized state for these incoming pulses, the control voltage will become more positive or negative, depending on whether or not the incoming pulse information resulted from a sampling rate that is greater or less than the receiving clock. The magnitude of this error signal will, as indicated, be in the millivolt range. This error signal in turn effects the biasing of transistor 120*a*, by current flow through transistor 120*a* and its effective load which is the clock, and causing its firing point to change. A positive error signal will cause the clock frequency to decrease, and a negative voltage will cause the clock frequency to increase. This change in bias of the first transistor 120*a* results in a frequency change by the fact that the time controlling elements are fixed and when the bias is raised or lowered the resultant turn-on point will occur later or earlier on the RC charging curve. This time control feature is similar in operation to the standard free running multivibrator circuit operation.

During normal demodulator operation when the receiver clock rate and phase is equal to that of the transmitter clock controlling the sample rate, the output level of the integrator will be essentially at zero potential. However, due to the integration of the pulse information and when the receiver clock frequency is greater or less than the frequency of the transmitter clock controlling the sample time or a phase difference exists, the time averaged potential of the pulse error signal as just discussed will be millivolts greater or less than the quiescent operating points and will present an error signal to the clock for synchronization with the incoming signal. In FIGURE 1, it is shown how control voltage amplitude from device 12 decreases as synchronization is achieved. As should thus be apparent to those skilled in the art, a phase difference is corrected by a transistory change in frequency which causes an effective phase lead or lag as required, at which time the correct frequency is then regained.

The following components were found particularly suitable for use in the circuit according to FIGURE 3, and it will be understood that these components are merely given by way of example and are not to be considered as limiting to the invention:

| | | |
|---|---|---|
| Transistor 112 | | 2N1402 |
| Transistor 115 | | 2N1402 |
| Transistor 117 | | 2N1402 |
| Transistor 120*a* | | 2N1499 |
| Transistor 120*b* | | 2N1499 |
| Transistor 121 | | 2N1499 |
| Capacitor 127 | microfarads | 0.047 |
| Capacitor 128 | do | 0.33 |
| Transistor 130 | | 2N1402 |
| Transistor 131 | | 2N1499 |
| Transistor 133 | | 2N1402 |
| Diode 134 | | 1N281 |
| Diode 135 | | 1N281 |
| Transistor 137 | | 2N1402 |
| Diode 138 | | 1N281 |
| Diode 139 | | 1N281 |
| Capacitor 140 | microfarads | 0.047 |
| Transistor 141 | | 2N1499 |
| Transistor 144 | | 2N1132 |
| Transistor 145 | | 2N1711 |
| Capacitor 147 | microfarads | 0.47 |

Figure 4:
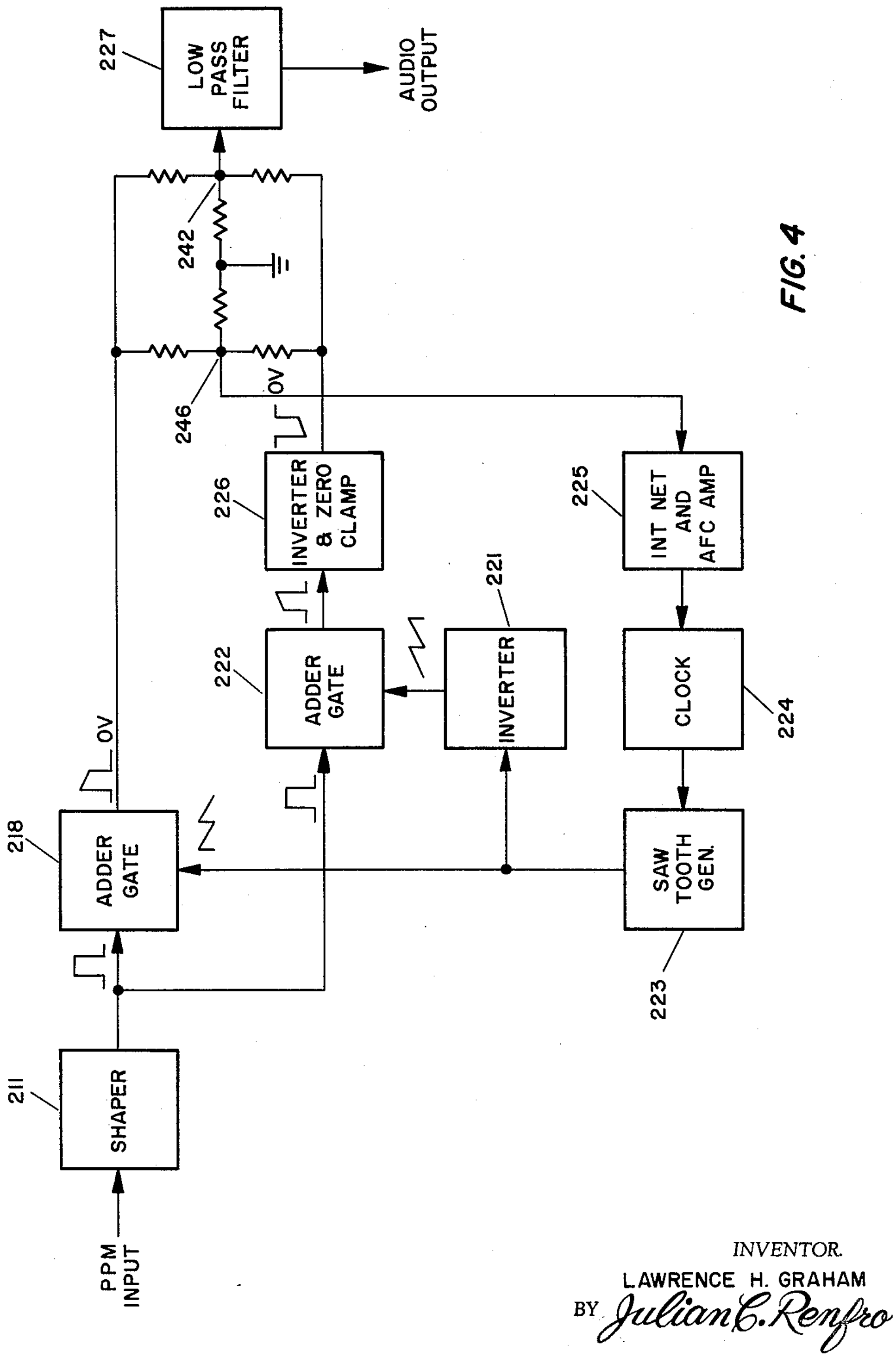
FIGURE 4 is a block diagram of an alternate embodiment.

An alternate embodiment as revealed in FIGURE 4 employs much of the same circuitry previously described, including Shaper 211, Adder gates 218 and 222, Integrating Network and AFC Amplifier 225, Clock 224, Sawtooth Generator 223, summing networks 246 and 242, and Low Pass Filter 227.

Shaper 211 is provided to supply pulses of fixed width and amplitude as pulse input signals to adder gates 218 and 222, and these gates, in addition to receiving the shaped pulses as one of their input signals, receive a second input signal in the form of a recurrent ramp waveform. Gate 218 receives its input ramp signal directly from the ramp generator, whereas gate 222 receives the inverse of this ramp waveform from inverter 121 as it appears at the output of the ramp generator. Inverter 221 is a conventional transistor stage having unity gain and will deliver to gate 222 an inverse ramp waveform operating between the same points of potentials as that output being emitted from the ramp generator.

Gating action is the same for both gates 218 and 222, each of which resembles previously described gate 118. Consequently, the output from each gate is a positive-going pulse whose amplitude is determined by its point of coincidence with its input recurrent ramp waveform. Signals appearing at the output of gate 218 can be corresponded with Line E, FIGURE 2, whereas the output of gate 222 after being inverted and clamped to the zero reference would be the pulse train of Line F.

To derive the balanced output condition in accordance with this second technique, it becomes therefore necessary to invert the output of gate 222 and clamp its base line to the zero reference. To this end, Inverter and Zero Clamp 226 is provided. The inverter employed is a transistor amplifier having unity gain, which is A.C. coupled to an emitter follower. Normal action of the emitter follower in turn is biased to fix its output waveforms base line at the zero reference, and the amplitudes of the train of pulses appearing in its output will be negative going. Amplitude variations of this train of pulses will appear as the train of pulses shown in Line F of FIGURE 2.

Summer 242 is provided for the algebraic addition of the pulses appearing at the output of gate 218 and inverter and zero clamp 226. The summer 242 is composed of three resistors and its functions are as previously described for summer 142. Pulse information emitted from the summer appears as the pulse train of Line G, FIGURE 2 for a sinusoidal modulation signal. For the actual reconstruction of audio information Low Pass Filter 227 is provided.

A second summing network 246, which is identical in configuration of summer 242, provides pulse AFC information as the input to the Integrating Network and AFC Amplifier 225. The operation and pulse information appearing at the output of summer 246 is of the same form as described for summer 146, the essential difference being that summer 246 is high impedance device, and summer 242 is a low impedance device.

Operation of the Integrating Network and AFC Amplifier 225, Clock 224, and Sawtooth generator 223, is as previously described for the corresponding components in the previous figures.

Other embodiments within the scope of this invention may be apparent to those skilled in the art, and accordingly I am not to be limited to the exact teachings set forth herein, except as required by the scope of the appended claims.

I claim:

1. A balanced output pulse position modulation detector comprising input means for receiving a train of incoming pulse position modulated pulses, controllable frequency waveform generator means for generating at the output thereof at least one recurring voltage waveform having an amplitude at any instant which is a linear function of time and having an average frequency approximately that of the source of said incoming pulses, means for combining said pulse train and the output from said waveform generator means, for developing first and second trains of resultant positive and negative pulse pairs containing amplitude information, means for adding said pairs of opposite polarity resultant pulses to produce a pulse train of difference pulses whose envelope represents the modulated information from the source of incoming pulses, and means for sensing the non-symmetry of said envelope with respect to a reference voltage level to generate a signal for correcting the phase and frequency of said waveform generator means to restore the envelope of said difference pulses to the symmetry condition.

2. The balanced output pulse position modulation detector as defined in claim 1 in which said waveform generator means generates at its output a single recurring voltage waveform, and inverting means are employed to provide an inverted version of the train of incoming pulse position modulated pulses, the incoming pulse train and the inverted version of same being respectively combined with said waveform generator means to provide said first and second trains of resultant positive and negative pulse pairs containing amplitude information.

3. The balanced output pulse position modulation detector as defined in claim 1 in which said waveform generator means generates two oppositely going recurring voltage waveforms, each of which is combined with said incoming pulse train to provide said first and second trains of resultant positive and negative pulse pairs containing amplitude information.

4. The balanced output detector as defined in claim 1 in which said means for combining said pulse train and the output from said waveform generator means includes the use of at least one adder gate, the amplitude of each pulse at the output of said gate being proportional to the amplitude of the recurring voltage waveform at the time of its coincidence with the respective pulse of said pulse train.

5. A balanced output pulse position modulation detector comprising input means for receiving a train of incoming pulse position modulated pulses, ramp waveform generator means for generating at least one recurrent voltage waveform whose amplitude at any instant is a linear function of time and whose average frequency is approximately that of the sampling pulses from the source of said incoming pulse position modulated pulses, means for creating a series of pairs of opposite polarity, simultaneously occurring resultant pulses from a combination of the pulses of said train of pulses and said recurrent voltage waveform, the amplitudes of the pulses of one polarity of said pairs being proportional to the time of arrival of such pulses with respect to the starting point of said ramp voltage waveform, and the amplitudes of the pulses of the other polarity being inversely proportional to such time of arrival, means for producing a train of difference pulses from an addition of said opposite polarity pulses, the envelope of the difference pulses thus representing the modulated information from a source of incoming pulses and therefore amounting to an information bearing wave output of said detector, and means for controlling the phase and frequency of said ramp waveform generator means, the input to said generator controlling means being derived from any dissymmetry of said envelope with respect to a reference voltage.

6. The balanced output demodulator as defined in claim 5 in which said means for creating the series of resultant pulses includes a pair of adder gates, each gate being associated with the pulses of one polarity, and the outputs from which are normally at zero reference, said gates, in the presence of said train of pulses producing output pulses of preestablished polarity, the amplitude of each output pulse being proportional to the point of intercept of the respective pulse of said train with said recurrent voltage waveform.

7. A balanced output pulse position modulation detector comprising input means for receiving a train of incoming pulse position modulated pulses, means for creating for each received pulse a pair of opposite polarity simultaneously occurring pulses, waveform generator means for generating a recurrent voltage waveform having an amplitude at any instant which is a linear function of time and having an average frequency approximately that of the source of said incoming pulses, means for respectively combining the ensuing trains of positive going and negative going pulses with said recurrent voltage waveform for creating first and second trains of resultant positive and negative pulses containing amplitude information, the amplitudes of the pulses of one of said trains of resultant pulses being additive with the instantaneous value of said recurrent voltage waveform, and the simultaneously occurring pulses of the other train being subtractive from such instantaneous value of said recurrent voltage waveform, whereby the amplitudes of the pulses of each pair of pulses of the first and second trains are thus proportional and inversely proportional, respectively, to the time of arrival of the pulse pairs with respect to the recurrent voltage waveform, means for adding said pairs of opposite polarity resultant pulses to produce a pulse train of difference pulses, the envelope of said difference pulses thus representing the modulated information from the source of incoming pulses and therefore a detector output, means for sensing the symmetry of said envelope with respect to a reference voltage level, and for generating a D.C. potential which reflects the magnitude and direction of any non-symmetry of said envelope, and means associated with said waveform generator for controlling its phase and frequency to thereby bring the envelope of said difference pulses back into the symmetry condition.

8. A balanced output pulse position modulation detector comprising input means for receiving a train of incoming pulse position modulated pulses, means for creating from each pulse of said train of pulses a pair of opposite polarity pulses of substantially identical amplitude and width, ramp waveform generator means for generating a recurrent voltage waveform whose amplitude at any instant is a linear function of time and whose average frequency is approximately that of the sampling pulses from the source of said incoming pulse position modulated pulses, means for adding the ramp voltage from said ramp waveform generator to each incoming pulse voltage and to the opposite polarity version of same to produce a pair of simultaneous resulting pulses whose amplitudes are thus proportional, and inversely proportional, respectively, to the time of arrival of pulses with respect to the starting point of a ramp of said ramp voltage waveform, means for adding each pair of resulting pulses, thus producing a train of difference pulses, each difference pulse having an amplitude representing the difference in absolute amplitude of the pulses constituting each pair, the envelope of the difference pulses thus representing the modulated information from the source of incoming pulses, and therefore amounting to an information bearing wave output of said detector, said train of difference pulses having a long term average of zero volts when said ramp waveform generator is in phase and frequency synchronization with the sampling pulses from said source of incoming pulses, averaging means for producing a commensurate D.C. potential when said generator means is not in synchronization, which potential reflects the sense of the difference in synchronization, means for controlling the frequency and phase of said generator in response to the amplitude and polarity of said D.C. potential, thus to produce a corrective change in said ramp generator to bring about synchronization with said source sampling pulses and thus a zero long term average for said pulse train.

9. A balanced output pulse position modulation detector comprising input means for receiving a train of incoming pulse position modulated pulses, shaper means to remove amplitude and/or width variations from said incoming pulses and to produce therefrom a train of pulse position modulated pulses having substantially uniform amplitude and width, such amplitude being of a certain polarity, ramp waveform generator means for generating a recurrent voltage waveform whose amplitude at any instant is a linear function of time and whose average frequency is approximately that of the sampling pulses of the source of said incoming pulse position modulated pulses, means for creating pulses having the same fixed amplitude of said incoming pulses but of opposite polarity with respect to said incoming pulse, means for adding the ramp voltage from said ramp waveform generator to each incoming pulse voltage and to the opposite polarity version of same to produce a pair of resulting pulses whose amplitudes are thus proportional and inversely proportional, respectively, to the time of arrival of said incoming pulse with respect to the starting point of a ramp of said ramp voltage waveform, said adding means producing a zero output voltage for any time for which no incoming pulse position modulated pulse is present, means for adding said pairs of resulting pulses, producing a pulse train whose individual pulses, due to the opposite polarity of each of said pair of resulting pulses, is the difference between the absolute amplitude of said pair of resulting pulses, and whose envelope thus represents the information bearing modulation from the source of said incoming pulse position modulating pulses, said train of summed pulses having a long term average of zero volts when said ramp waveform generator means is in phase and frequency synchronization with said sampling pulses of said source of incoming pulses, averaging means for producing a D.C. potential for the condition wherein said ramp waveform generator means is not in said frequency and phase synchronization, such that said D.C. potential is of either polarity as determined by the sense of said difference in synchronization, means for controlling the frequency and phase of said ramp waveform generator, latter means using said D.C. potential to produce said synchronization with said source sampling pulses, thus producing the desired zero long term average for said pulse train, and means for extracting the envelope of said added pair of resulting pulses so as to produce the information bearing wave output.

No references cited.